Figure 1:
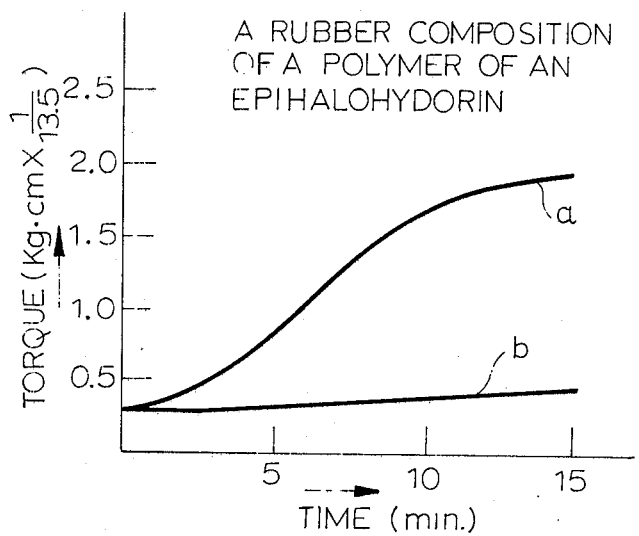

United States Patent [19]

Shimogawa et al.

[11] 3,876,590
[45] Apr. 8, 1975

[54] CROSS-LINKED POLYMER OF AN EPIHALOHYDRIN AND A PROCESS FOR PRODUCING THE SAME

[75] Inventors: Sachio Shimogawa; Nobuo Yamada; Takashi Fujio, all of Amagasaki; Takashi Kodama, Itami; Tetsuya Nakata, Ibaragi, all of Japan

[73] Assignee: Osaka Soda Co., Ltd., Osaka, Japan

[22] Filed: Sept. 28, 1973

[21] Appl. No.: 401,873

[30] Foreign Application Priority Data
Oct. 5, 1972  Japan............................ 47-100016
Nov. 1, 1972  Japan............................ 47-109731

[52] U.S. Cl................ 260/79; 260/2 A; 260/23 R; 260/23 S; 260/23 H; 260/37 R; 260/79; 260/79.5 C; 260/793; 260/874; 260/887; 260/897 R
[51] Int. Cl............................................. C08g 23/00
[58] Field of Search......... 260/79, 79.5 C, 2 A, 793, 260/887, 897 R, 874

[56] References Cited
UNITED STATES PATENTS
3,700,650  10/1972  Hani et al. .................... 260/2 A
3,708,461  1/1973  Karastu et al. ................... 260/79

*Primary Examiner*—Melvyn I. Marquis
*Attorney, Agent, or Firm*—Sherman & Shalloway

[57] ABSTRACT

A cross-linked polymer of an epihalohydrin prepared by heating a polymer of an epihalohydrin in the presence of a metal salt of ethylene-bisdithiocarbamic acid having the following formula:

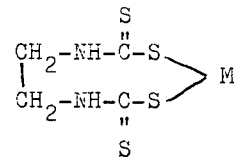

wherein symbol M stands for a divalent metal atom in the amount of from 0.1 to 10 parts by weight based on 100 parts by weight of the polymer of epihalohydrin, said epihalohydrin polymer being selected from the group consisting of polymers of epihalohydrin, copolymers of epihalohydrin with alkylene oxides, and mixtures containing other sulphur vulcanizable rubbers of not more than 50 percent by weight based on the weight of the mixture of the sulphur-vulcanizable rubbers with these homo- or co-polymers, and a process for preparation said polymer.

5 Claims, 2 Drawing Figures

CROSS-LINKED POLYMER OF AN EPIHALOHYDRIN AND A PROCESS FOR PRODUCING THE SAME

The present invention is concerned with a process of cross-linking epihalohydrin polymers, copolymers of an epihalohydrin and an alkylene oxide, and mixtures with other sulphur-vulcanizable rubbers containing more than 50 percent by weight of these polymers and copolymers. Whenever "epihalohydrin polymer" is used in describing the subject invention, it is to be understood that "epihalohydrin copolymer with alkylene oxide" and "mixtures of more than 50 percent by weight of epihalohydrin polymers and/or epihalohydrin copolymers with alkylene oxide with other sulphur-vulcanizable rubbers" may be substituted therefor, with the obvious exceptions of specific examples and the like.

Epihalohydrin polymers assume a variety of configurations depending upon the type of the polymerization catalyst used. Particularly polymers of a high molecular weight and which are amorphous or nearly amorphous are vulcanized, (that is, cross-linked) to be used as a special rubber having useful physical properties. Known processes of producing cross-linked epihalohydrin polymers include the use of polyamines, polyamine hydrochlorides, polyamine carbamates and the like; a process of subjecting polymers to the action of a substance selected from the group consisting of sulphur, dithiocarbamate, thiuram sulfide and thiazole in the presence of an amine (U.S. Pat. No. 3,026,305); a process involving the use of 2-mercaptoimidazoline or 2-mercaptopyrimidine (U.S. Pat. No. 3,341,491); etc.

The cross-linking reaction of epihalohydrin polymers is said to be caused by the reaction of halogen in the side chain. Obviously the above methods differ from the cross-linking reaction sulphurvulcanizable rubbers in general.

The present invention relates to a cross-linked polymer of an epihalohydrin prepared by heating an epihalohydrin polymer, copolymer, or mixture thereof with sulphur-vulcanizable rubbers in the presence of a metal salt of ethylenebisdithiocarbamic acid having the following formula

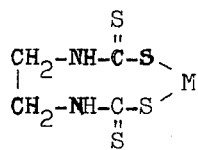

wherein symbol M stands for a divalent metal atom in an amount of from 0.1 to 10 parts by weight based on 100 parts by weight of the polymer of epihalohydrin. The epihalohydrin polymer is selected from the group consisting of: polymers of epihalohydrin; copolymers of epihalohydrin with alkylene oxides; and mixtures of not more than 50 percent by weight based on the weight of the mixture of other sulphur-vulcanizable rubbers with these homo- or copolymers.

In the proposal of U.S. Pat. No. 3.026,305, there is described the utilization of straight chain dithiocarbamates being represented by the following formula

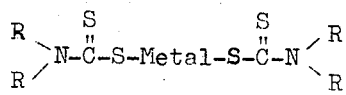

in the presence of an amine or an amine and sulphur. The dithiocarbamates concerned are widely used as vulcanizing agents (or vulcanization accelerators) and are well known for use in conjunction with sulphur or sulphur releasing compounds in vulcanizing the usual sulphur-vulcanizable rubbers. In order to obtain satisfactory results in the presence of an amine, vulcanization of a polymer of an epihalohydrin is conducted using the aforesaid known vulcanizing agents in the presence of sulphur and it is demonstrated that this vulcanizing agent alone will not bring about vulcanization results capable of utilization.

The present inventors have devoted themselves to studying the vulcanization of an epihalohydrin polymer and discovered that the metal salt of ethylene-bisdithiocarbamic acid being represented by the aforesaid formula (conventionally well known and used as the active component of agricultural-horticultural fungicides) could exhibit, by itself, excellent vulcanization effects on the aforesaid polymers, or preferably can be used in the presence of an oxide or hydroxide of metals of Group IIA of the Perodic Table.

Explanation will be given in more detail by referring to drawings. It was entirely unexpected and surprising result that the aforesaid straight chain dithiocarbamates, which are known vulcanizing agents, exhibit, by themselves, vulcanization effects on the usual rubber, while not showing any vulcanization effects capable of utilization on the polymers of epihalohydrin. In sharp contrast, the aforesaid known fungicidal active component used in the present invention does not show any vulcanization effects capable of utilization on the usual rubber while showing excellent vulcanization effects on the polymers of epihalohydrin.

In the present invention it was further found that the co-presence of the oxide or hydroxide of a metal from Group IIA of the Periodic Table increased the rate of vulcanization and at the same time, improved heat resistance of the cross-linked product.

Furthermore, when a cross-linked product of an epihalohydrin polymer was conventionally produced, its vulcanization vessel, such as a molding die, vulcanization can, and so on, was markedly corroded and there was a long felt need for the inhibition of corrosion or a cross-linking method not accompanied with corrosion. According to the present invention, it has been also discovered that the co-presence of a certain amine or amine carboxylate can bring about an increase of the cross-linking rate at the same time, make it possible to inhibit die corrosion to a remarkable degree.

Cross-linked blends of an epihalohydrin polymer with a variety of other sulphur-vulcanizable rubbers are interesting as materials with useful modified physical properties and it was found that according to the present invention, it was made easier to cross-link the aforesaid blends.

Thus, the present invention is designed to provide a novel cross-linked polymer from an epihalohydrin polymer.

The second object of the present invention lies in providing a cross-linking method having reduced die corrosion and producing cross-linked products of an epihalohydrin polymer.

The third object of the present invention lies in providing a vulcanizing method easily capable of cross-linking blends of epihalohydrin polymers with unsaturated rubbers.

Figure 2:
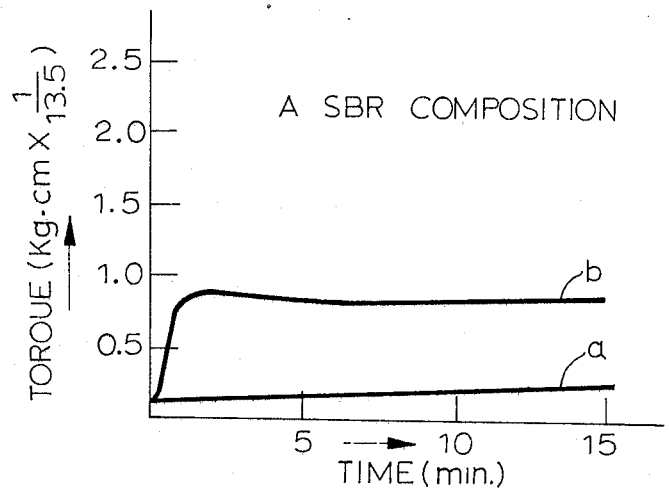

A conventional rubber composition and a rubber composition of an epihalohydrin polymer having the following compositions were prepared using zinc ethylene-bisdithiocarbamate (zineb) (line *a* in the drawings) as typical of the known compounds used in the present invention and zinc dimethyldithiocarbamate (PZ) (line *b* in the drawings) as typical of the known vulcanizing agents, and were vulcanized at the same conditions. FIG. 1 and FIG. 2 are indicative of vulcanization curves on that occasion. Measurement was conducted by means of the JSR type curelastomer (155°C.: amplitude angle 3°).

Sulphur-vulcanizable rubber (SBR) composition

|  | Present invention | Comparison |
|---|---|---|
| SBR | 100 | 100 |
| Zineb | 1 | — |
| PZ | — | 1 |
| Stearic acid | 1 | 1 |
| FEF carbon | 40 | 40 |
| MB | 1 | 1 |
| MgO | 5 | 5 |
| TT | 1 | 1 |

(Note):
SBR Styrene-butadiene rubber (JSR-1778)
MB 2-Mercaptobenzothiazole (antioxidant)
TT Tetramethylthiuram disulfide
Zineb Zinc ethylene-biodithiocarbamate
PZ Zinc dimethyldithiocarbamate
FEF carbon A product of Tokyo Denkyoku Company Rubber composition of a polymer of an epihalohydrin

|  | Present invention | Comparison |
|---|---|---|
| CHC | 100 | 100 |
| Zineb | 1 | — |
| PZ | — | 1 |
| Tin stearate | 1 | 1 |
| FEF carbon | 40 | 40 |
| MB | 1 | 1 |
| MgO | 5 | 5 |
| TT | 1 | 1 |

(Note):
CHC Ethylene oxide-epichlorohydrin (1:1) copolymerized rubber (a product of Osaka Soda Co., Ltd.)

The results of FIG. 1 are indicative of the fact that PZ does not exhibit any vulcanization effect capable of utilization in the aforesaid rubber composition of the epihalohydrin polymer whereas zineb exhibits excellent vulcanization effects in the composition concerned. The results of FIG. 2 are indicative of the fact that PZ exhibits vulcanization effects in the aforesaid SBR composition whereas zineb does not exhibit any vulcanization effect capable of utilization in the composition concerned.

The experimental results demonstrate the fact that the chain dithiocarbamate and cyclic dithiocarbamate differ from each other in vulcanization characteristics.

The metal salts of ethylene-bisdithiocarbamic acid, used in the present invention include barium, zinc, copper, cadmium lead salt, iron, nickel, manganese, etc. Particularly preferred are zinc and lead salts.

In the present invention, in addition to the metal salts, the epihalohydrin polymer can be incorporated with at least one accelerator selected from the group consisting of oxides and hydroxides of Group IIA metals of the Periodic Table, sulphur, thiuram sulfide, morpholine disulfide, secondary amine, tertiary amine, guanidines and mono- or di-carboxylates of these amines.

The above thiuram sulfide is a compound presented by the general formula

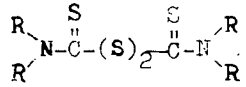

in which R stands for hydrogen, an alkyl, a cycloalkyl or a polymethylene group with 2 R's attached to the same nitrogen being connected to form a ring, but in no case 2 R's attached to the same nitrogen being both hydrogen, and $x$ is an integer not smaller than 1.

Specific examples of these compounds are tetramethylthiuram disulfide, tetraethylthiuram disulfide, tetrabutylthiuram disulfide, pentamethylenethiuram disulfide, tetramethylthiuram tetrasulfide, pentamethylenethiuram tetrasulfide, etc.

Useful Group IIA metal oxides or hydroxides include magnesium oxide, calcium oxide, barium oxide, magnesium hydroxides calcium hydroxide and barium hydroxide. Particularly preferred is magnesium oxide.

In the present invention, amines or amine carboxylates can be used, but amine carboxylates are preferred. Useful amines, are secondary or tertiary amines represented by $R_2NH$, $R_3N$, or guanidines. Preferred amine carboxylates are those produced from monobasic carboxylic acids and secondary or tertiary amine salts being represented by $R'COONH_2R''_2$, $R'COONHR''_3$; and dibasic carboxylic acids and secondary or tertiary amine salts being represented by $R''_2H_2NOOR-R'''$ —$COONH_2R''_2$ and $R''_3HNOOC—R'''$ —$COONHR''_3$. In the above formula $R_2NH$, $R_3N$, it is preferred that R should be a group selected from alkyl groups with 4-8 carbons, alkenyl groups with 4-8 carbons, cyclohexyl groups, methylcyclohexyl groups and ethylcyclohexyl groups. It is not necessarily required that R should be all the same. Further, in the aforesaid formulae $R'COONH_2R''_2$, $R'COONHR''_3$, it is preferred that R' should be a group selected from alkyl or alkenyl groups with 1-11, preferably 3-8, carbons; phenyl groups; tolyl groups; phenylvinyl groups; $CH_3O-COCH=CH-$ groups; $C_2H_5OCOCH=CH-$ groups; $C_3H_9OCOCH=CH-$ groups; and $C_4H_9OCOCH=CH-$ groups. R'' is selected from alkyl or alkenyl groups with 1-8 carbons; cyclohexyl groups; methylcyclohexyl groups and ethylcyclohexyl groups.

As dibasic carboxylic acids, there can be used those in which R''' is a methylene chain of 2-8 carbons, such as succinic acid, glutaric acid, adipic acid, pimelic acid, suberic acid, azelaic acid, sebacic acid; or maleic acid, fumaric acids, phthalic acid and so on. The amine used in forming a salt with dibasic carboxylic acid is the same as in the case of monobasic acids.

Examples of guanidines include, diphenylguanidine, diorthotolylguanidine, orthotolylbiguanidine and the like.

Examples of epihalohydrin polymers to be cross-linked in the present invention include homopolymers of epichlorohydrin, epibromohydrin, epiiodohydrin, methylepichoro hydrin and their copolymers, and copolymers of the above epihalohydrins with alkylene oxides, such as ethylene oxide, propylene oxide, butylene oxide, styrene oxide, phenylglycidyl ether, allyl glycidyl ether, butylglycidyl ether and so on. These polymerized products can be produced using a variety of catalysts, but the cross-linking method of the present invention can be put in practice regardless of the process for the production of polymers.

Examples of other sulphur-vulcanizable rubbers capable of being blended with the aforesaid polymers to carry out the cross-linking reaction include natural rubber, styrene-butadiene rubber, butadiene rubber, isoprene rubber, isoprene-isobutylene rubber, acrylonitrile-butadiene rubber, ethylene-propylene-diene rubber, propylene oxide-allylglycidyl ether copolymer and so on. These rubbers are used in and amount of not more than 50 percent by weight based on the weight of the mixture.

In the present invention, the amount of the aforesaid metal oxides, hydroxides, sulphur, amines or carboxylates thereof and sulfides that can be used is suitably varied, but in the case of the said metal oxides, hydroxides and amines or their salts, it is 0.1 – 20 parts by weight, preferably 1 – 10 parts by weight and most preferably 1 – 7 parts by weight, based on 100 parts by weight of the epihalohydrin polymer, whereas in the case of the sulphur and sulfides, it is about 0.05 – 5 parts by weight based on 100 parts by weight of the epihalohydrin polymer.

The mixing of these vulcanizing agents and accelerators with polymers can be conducted by any conventionally known means such as a mixing roll, kneader, Banbury mixer and so on. It is also possible to add them to the solution of the epihalohydrin polymer. Furthermore, there can be incorporated other known components used for the production of cross-linked molded products, such as carbon; inorganic fillers, such as silica, silicate, calcium carbonate, magnesium carbonate and so on; lubricants; plasticizers, softeners, stabilizers, antioxidants, flame resistant agents, pigments and the like. The compounding of the cross-linking agent and other ingredients of the present invention can be conducted in any order.

The most preferred cross-linked polymer in the present invention is a cross-linked polymer of an epihalohydrin prepared by heating a an epihalohydrin polymer in the presence of a metal salt of ethylene-bisdithiocarbamic acid having the following formula

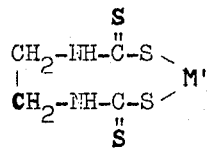

wherein the symbol M' stands for a divalent metal atom selected from the group consisting of Pb and Zn in the amount of from 0.1 to 10 parts by weight based on 100 parts by weight of the epichalohydrin polymer; 0.1 – 20 parts by weight based on 100 parts by weight of the epihalohydrin polymer of magnesia; at least one member selected from the group consisting of 0.05 – 5 parts by weight based on 100 parts by weight of the epihalohydrin polymer of sulphur, thiuram disulfide, thiuram tetrasulfide and morpholine disulfide and 0 – 7 parts by weight based on 100 parts by weight of the epihalohydrin polymer of $C_4-C_9$ carboxylates of aliphatic or alicyclic secondary or tertiary amines. The epihalohydrin polymer is selected from the group consisting of: poly(epichlorohydrin): copolymers of epichlorohydrin and ethylene oxide; copolymers of epichlorohydrin and propylene oxide; and mixtures containing other sulphur-vulcanizable rubber present in not more than 50 percent by weight based on the weight of the mixture of the sulphur-vulcanizable rubbers with said homo- or copolymers.

In the present invention, the cross-linking reaction can be carried out by heating these mixtures usually at a temperature of 120°C or more, for instance, at a temperature ranging from 120° to 200°C. The reaction time usually takes 5 – 60 minutes, but with the temperature elevated a, shorter reaction time will be required. For hot molding of the product, there can be used all heating systems of direct or indirect heating. Examples are by means of press die molding, extrusion or injection molding and continuous heating involving the use of an oil bath, sand bath and so on. It is possible to conduct so-called "after-care" with a view to improving the physical properties of vulcanized products.

The most suited embodiment in the process of the present invention is a process for production of a cross-linked polymer of an epihalohydrin, characterized by heating a polymer of ethylene-bisdithiocarbamic acid having the following formula

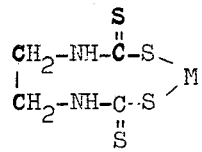

wherein the symbol M stands for a divalent metal atom in the amount of from 0.1 to 10 parts by weight based on 100 parts by weight of the epihalohydrin polymer and 1 – 7 parts by weight based on 100 parts by weight of the epihalohydrin polymer of $C_4-C_9$ carboxylates of aliphatic or alicyclic secondary or tertiary amines, said epihalohydrin polymer being selected from the group consisting of: homopolymers of epihalohydrin; copolymers of epihalohydrin with alkylene oxide; and mixture of not more than 50 percent by weight based on the weight of the mixture of other sulphur-vulcanizable rubbers with these homo- or co-polymers.

Some embodiments of the present invention will be explained hereinafter by way of Example. The amounts of compositions in the Examples are all based on weight unless otherwise specified. The following is the general process for the production of vulcanized products in the Examples. Using open rolls with the front rolls maintained at 70°C., and the rear rolls at 80°C., the cross-linking agent and other compounding agents (in the amounts clearly described in the Examples with regard to 100 parts of the polymer) were blended together to produce a compound. The compound so obtained was heated and applied with pressure at 155° for 30 minutes under 100 kg/cm² to mold sheet-like samples, whose physical properties were measured.

Examples 1 and 2

Examples 1 and 2 relate to cross-linking epichlorohydrin homopolymer rubber and epichlorohydrin-ethylene oxide copolymerized rubber with zinc ethylenebisdithiocarbamate alone. The comparative Examples are indicative of the results of cross-linking the above rubber with zinc tetramethyldithiocarbamate. The compounds having the following compositions, were produced according to the above general method and vulcanized by means of a die press at 155°C. for 30 minutes.

Compositions

|            | Examples |      | Comparative Examples |      |
|------------|----------|------|----------------------|------|
|            | 1        | 2    | 1                    | 2    |
| CHR*¹      | 100      |      | 100                  |      |
| CHC*²      |          | 100  |                      | 100  |
| St-Zn*³    | 1        | 1    | 1                    | 1    |
| NBC*⁴      | 1        | 1    | 1                    | 1    |
| FEF-carbon*⁵ | 40     | 40   | 40                   | 40   |
| EBZ*⁶      | 2        | 2    |                      |      |
| PZ*⁷       |          |      | 2                    | 2    |

Physical properties of vulcanized products at 155°C for 30 minutes

| TB*⁸  | 115  | 90   | 43   |                |
|-------|------|------|------|----------------|
| EB*⁹  | 1000 | 1000 | 1300 | Not vulcanized |
| PS*¹⁰ | 28   | 30   | 54   |                |
| H*¹¹  | 66   | 63   | 60   |                |

*¹A product of Goodrich company, epichlorohydrin homopolymerized rubber, Hydrin No. 100
*²A product of Goodrich company, epichlorohydrinethylene oxide copolymerized rubber, Hydrin No. 200
*³Lubricant, zinc stearate
*⁴Antioxidant, nickel dibutyldithiocarbamate
*⁵A product of Tokai Denkyoku Company, Seast 116
*⁶Zinc ethylene bisdithiocarbamate
*⁷Zinc tetramethyldithiocarbamate
*⁸Strength at a time of breakdown, kg/cm²
*⁹Elongation percentage at a time of breakdown, %
*¹⁰Permanent elongation percentage, %
*¹¹Hardness, Shore A

Examples 3, 4, 5 and 6

The following are examples for vulcanization of epichlorohydrin rubber in the system wherein magnesia was added to a variety of ethylene bisdithiocarbamates.

Compositions

|              | Example 3 | Example 4 | Example 5 | Example 6 |
|--------------|-----------|-----------|-----------|-----------|
| CHR*¹        | 100       | ″         | ″         | ″         |
| St-Sn*¹²     | 2         | ″         | ″         | ″         |
| FEF-carbon*⁵ | 4         | ″         | ″         | ″         |
| MB*¹³        | 1         | ″         | ″         | ″         |
| MgO          | 2         | ″         | ″         | ″         |
| EB-Cd*¹⁴     | 2         |           |           |           |
| EB-Z*⁶       |           | 2         |           |           |
| EB-Mn*¹⁵     |           |           | 2         |           |
| EB-Pb*¹⁶     |           |           |           | 2         |

Physical properties of vulcanized products at 155°C. for 30 minutes

|    | Ex. 3 | Ex. 4 | Ex. 5 | Ex. 6 |
|----|-------|-------|-------|-------|
| TB | 130   | 137   | 152   | 135   |
| EB | 860   | 695   | 845   | 890   |
| PS | 20    | 17    | 16    | 16    |
| H  | 66    | 72    | 66    | 66    |

*¹²Lubricant, tin stearate
*¹³Antioxidant, 2-mercaptobenzothiazole
*¹⁴Cadmium ethylene-bisdithiocarbamate
*¹⁵Manganese ethylene-bisdithiocarbamate
*¹⁶Lead ethylene-bisdithiocarbamate

Examples 7, 8, 9 and 10

The following are examples for vulcanization of epichlorohydrin-ethylene oxide copolymerized rubber by using a variety of ethylene-bisdithiocarbamates in conjunction with sulphur and magnesia.

Compositions

|              | Example 7 | Example 8 | Example 9 | Example 10 |
|--------------|-----------|-----------|-----------|------------|
| CHC*²        | 100       | 100       | 100       | 100        |
| St-Zn*³      | 1         | 1         | 1         | 1          |
| FEF-carbon*⁵ | 40        | 40        | 40        | 40         |
| NBC*⁴        | 1         | 1         | 1         | 1          |
| MgO          | 2         | 2         | 2         | 2          |
| Sₓ           | 1         | 1         | 1         | 1          |
| EB-Cd*¹¹     | 2         |           |           |            |
| EBZ*⁶        |           | 2         |           |            |
| EB-Mu*¹⁵     |           |           | 2         |            |
| EB-Pb*¹⁶     |           |           |           | 2          |

Physical properties of vulcanized products at 155°C. for 30 minutes

|    | Ex. 7 | Ex. 8 | Ex. 9 | Ex. 10 |
|----|-------|-------|-------|--------|
| TB | 166   | 150   | 154   | 165    |
| EB | 835   | 600   | 680   | 880    |
| PS | 21    | 18    | 18    | 20     |
| H  | 66    | 90    | 70    | 66     |

Examples 11, 12, 13 and 14

The following are examples for vulcanization of epichlorohydrin-ethylene oxide copolymerized rubber by using a variety of ethylene-bisdithiocarbamates in conjunction with thiuram disulfide and magnesia.

Compositions

|              | Example 11 | Example 12 | Example 13 | Example 14 |
|--------------|------------|------------|------------|------------|
| CHC*²        | 100        | ″          | ″          | ″          |
| St-Zu*³      | 2          | ″          | ″          | ″          |
| FEF-carbon*⁵ | 40         | ″          | ″          | ″          |
| MB*¹³        | 1          | ″          | ″          | ″          |
| MgO          | 5          | ″          | ″          | ″          |
| TT*¹⁷        | 1          | ″          | ″          | ″          |
| EB-Zu*⁶      | 2          |            |            |            |
| EB-Pb*¹⁶     |            | 2          |            |            |
| EB-Cu*¹⁸     |            |            | 2          |            |
| EB-Mn*¹⁵     |            |            |            | 2          |

Physical properties of vulcanized products at 155°C. for 30 minutes

|           | Ex. 11 | Ex. 12 | Ex. 13 | Ex. 14 |
|-----------|--------|--------|--------|--------|
| 100% Mod*¹⁹ | 35   | 23     | 10     | 31     |
| TB        | 141    | 133    | 101    | 151    |
| EB        | 640    | 750    | 1000   | 680    |
| H         | 70     | 73     | 65     | 72     |

*¹⁷Tetramethylthiuram disulfide
*¹⁸Copper ethylene-bisdithiocarbamate
*¹⁹100% modulus, kg/cm²

Examples 15, 16 and 17

The following are examples showing the vulcanization results of epichlorohydrin-ethylene oxide copolymerized rubber by using a variety of sulfides in conjunction with zinc ethylene-bisdithiocarbamate.

Compositions

|              | Example 15 | Example 16 | Example 17 |
|--------------|------------|------------|------------|
| CHC*²        | 100        | ″          | ″          |
| ST-Zn*³      | 2          | ″          | ″          |
| FEF-carbon*⁵ | 40         | ″          | ″          |
| MB*¹³        | 1          | ″          | ″          |
| MgO          | 5          | ″          | ″          |
| EBZ*⁶        | 4          | ″          | ″          |
| TBT*¹⁹       | 1          |            |            |
| TRA*²⁰       |            | 1          |            |
| R*²¹         |            |            | 1          |

Physical properties of vulcanized products at 155°C. × 30 minutes

|          | Ex. 15 | Ex. 16 | Ex. 17 |
|----------|--------|--------|--------|
| 100% Mod.| 40     | 54     | 49     |
| TB       | 145    | 122    | 123    |
| EB       | 410    | 350    | 310    |
| H        | 74     | 70     | 74     |

*¹⁹Tetrabutylthiuram disulfide
*²⁰Dipentamethylenethiuram tetrasulfide
*²¹Morpholine disulfide

Examples 18 - 27

The following are examples showing the results of cross-linking epichlorohydrin rubbers by adding a variety of amines or amine-carboxylates to the vulcanization system using ethylene-bisdithiocarbamate.

Compositions

|  | Ex. 18 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|
| CHC*2 | 100 | 100 | 100 | 100 | 100 | 100 | 100 |  |  |  |
| CHR*1 |  |  |  |  |  |  |  | 100 | 100 | 100 |
| St-Zu*3 | 2 | 2 | 2 | 2 | 2 | 2 | 2 | 2 | 2 | 2 |
| FEF carbon*5 | 40 | 40 | 40 | 40 | 40 | 40 | 40 | 40 | 40 | 40 |
| MB*13 | 1 | 1 | 1 | 1 | 1 | 1 | 0.5 |  | 1 | 1 |
| NBC*4 |  |  |  |  |  |  | 0.5 | 1 |  |  |
| TT*17 | 1 | 1 | 1 | 1 |  |  | 1 |  | 1 |  |
| $S_k$ |  |  |  |  | 0.2 | 0.2 |  | 0.2 |  | 0.2 |
| MgO | 5 | 5 | 5 | 5 | 5 | 5 | 5 | 5 | 5 | 5 |
| EBZ*6 | 2 | 2 | 1 | 2 |  |  | 2 | 2 | 2 | 2 |
| EB-Mn*15 |  |  |  |  | 2 | 2 |  |  |  |  |
| DCHA*22 | 5 |  |  |  |  |  |  |  |  |  |
| DT*23 |  |  | 1 |  |  |  |  |  |  |  |
| Caproic acid*24 DCHA |  | 3 |  |  | 5 |  |  |  |  |  |
| Cinnamic acid*25 DCHA |  |  |  |  |  |  |  |  |  | 5 |
| Cinnamic acid*26 DIPA |  |  | 3 |  |  |  |  | 5 |  |  |
| Methylmaleic acid*27 DIPA |  |  |  | 3 |  |  |  |  |  |  |
| Butyric acid*28 DBA |  |  |  |  |  | 3 |  |  |  |  |
| Sorbic acid*29 DCHA |  |  |  |  |  |  |  |  | 3 |  |
| Sorbic acid*30 TEA |  |  |  |  |  |  |  | 3 |  |  |

Physical properties of vulcanized products at 155°C. for 30 minutes

|  | | | | | | | | | | |
|---|---|---|---|---|---|---|---|---|---|---|
| 100% Mod. | 40 | 39 | 26 | 40 | 38 | 39 | 45 | 35 | 38 | 39 |
| TB | 131 | 121 | 110 | 120 | 119 | 122 | 98 | 125 | 123 | 121 |
| EB | 410 | 430 | 490 | 470 | 480 | 510 | 350 | 580 | 430 | 440 |
| H | 76 | 76 | 73 | 76 | 76 | 75 | 80 | 73 | 76 | 76 |

Physical properties after hot aging for 7 days at 150°C. (gear oven)

|  | | | | | | | | | | |
|---|---|---|---|---|---|---|---|---|---|---|
| 100% Mod. | 83 | 76 | 73 | 75 | 78 | 81 | 74 | 79 | 82 | 81 |
| TB | 104 | 92 | 87 | 93 | 90 | 90 | 105 | 106 | 113 | 115 |
| EB | 130 | 115 | 120 | 115 | 110 | 120 | 80 | 140 | 150 | 150 |
| H | 84 | 84 | 80 | 83 | 83 | 84 | 84 | 82 | 82 | 83 |

*22 Dicyclohexyl amine
*23 Diorthotolylguanidine
*24 Dicyclohexylamine-caproate
*25 Dicyclohexylamine-cinnamate
*26 Diisopropylamine-cinnamate
*27 Diisopropylamine-methylmaleate
*28 Dibutylamine-butyrate
*29 Diisopropylamine-sorbate
*30 Triethylamine-sorbate

Examples 28, 29, 30 and 31

The following are examples showing the results of cross-linking epichlorohydrin rubbers by adding amine salts of dibasic acid to the vulcanization system using ethylenebisdithiocarbamate.

Compositions

|  | Ex. 28 | Ex. 29 | Ex. 30 | Ex. 31 |
|---|---|---|---|---|
| CHC*2 | 100 | 100 | 100 |  |
| CHR*1 |  |  |  | 100 |
| St-Zn*2 | 2 | 2 | 2 | 2 |
| FEF-carbon*5 | 40 | 40 | 40 | 40 |
| MB*13 | 1 | 1 | 1 | 1 |
| $S_k$ | 0.2 | 0.2 | 0.2 | 0.2 |
| MgO | 5 | 5 | 5 | 5 |
| EBZ*6 | 2 | 2 | 2 | 2 |
| Fumaric acid*31 DCHA | 3 |  |  |  |
| Adipic acid*32 TEA |  |  | 3 |  |
| Sebacid acid*33 DCHA |  |  | 3 |  |
| Isophthalic acid*34 DIPA |  |  |  | 3 |

Physical properties of vulcanized products at 155°C. for 30 minutes

|  | Ex. 28 | Ex. 29 | Ex. 30 | Ex. 31 |
|---|---|---|---|---|
| 100μ Mod. | 35 | 31 | 38 | 36 |
| TB | 124 | 120 | 119 | 124 |
| EB | 420 | 490 | 420 | 430 |
| H | 75 | 74 | 76 | 75 |

*31 Dicyclohexylamine-fumarate
*32 Triethylamine-adipate
*33 Dicyclohexylamine-sebacate
*34 Diisopropylamine-isophthalate

Examples 32, 33 and 34

The following are examples showing the results of vulcanizing mixtures of epichlorohydrin and ethylene oxide copolymerized rubber and butadiene rubber in the vulcanization system using ethylene-bisdithiocarbamate.

Compositions

|  | Example 32 | Example 33 | Example 34 |
|---|---|---|---|
| CHC*2 | 80 | ″ | ″ |
| BR*35 | 20 | ″ | ″ |
| St*36 | 0.2 | ″ | ″ |
| St-Sn*12 | 0.8 | ″ | ″ |
| MB*13 | 1 | ″ | ″ |
| MgO | 5 | ″ | ″ |
| $S_R$ | 1 | ″ | ″ |
| EB-Mn*15 | 4 | | |
| EB-Pb*16 | | 4 | |
| EBZ | | | 4 |

Physical properties of vulcanized products at 155°C. for 30 minutes

|  | | | |
|---|---|---|---|
| TB | 150 | 143 | 148 |
| EB | 850 | 450 | 475 |
| H | 78 | 76 | 77 |

*35Polybutadiene rubber BR-01 (a product of Japan Synthetic Rubber Company)

*36Lubricant, stearic acid

Examples 35 and 36

The following are examples showing the results of vulcanizing mixtures of epichlorohydrin homopolymer rubber and natural rubber with lead ethylene-bisdithiocarbamate.

Compositions

|  | Example 35 | Example 36 |
|---|---|---|
| CHR*1 | 90 | 50 |
| NR*37 | 10 | 50 |
| St-Zn*3 | 2 | 2 |
| FEF-carbon*5 | 50 | 50 |
| MB*13 | 1 | 1 |
| MgO | 5 | 5 |
| EB-Pb*16 | 4 | 4 |

Physical properties of vulcanized products at 155°C. for 30 minutes

|  | | |
|---|---|---|
| TB | 153 | 145 |
| EB | 310 | 350 |
| H | 79 | 70 |

*37Natural rubber RSS No. 3

Example 33

The following is indicative of the results of vulcanizing epichlorohydrin-ethylene oxide copolymerized rubber and natural rubber.

Compositions

|  | Example 33 |
|---|---|
| CHC*2 | 90 |
| NR*37 | 10 |
| St-Zn*3 | 1 |
| FEB-carbon*5 | 50 |
| MB*13 | 1 |
| MgO | 5 |
| EB-Pb*16 | 4 |

Physical properties at

Compositions-Continued

|  | Example 33 |
|---|---|
| 155°C. for 30 minutes | |
| 300% Mod*38 | 92 |
| TB | 153 |
| EB | 550 |
| H | 78 |
| Degree of swelling*39 | +142 |

*38300% modulus, kg/cm²

*39Immersed in toluene of 20°C for 24 hours. Weight increased rate %

What we claim is:

1. A cross-linked polymer of epihalohydrin prepared by heating at 120° to 200°C. a polymer of an epihalohydrin in the presence of a metal salt of ethylene-bisdithiocarbamic acid having the following formula:

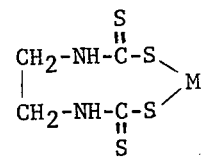

wherein M is a barium, zinc, copper, cadmium, lead, iron, nickel or manganese ion in the amount of from 0.1 to 10 parts by weight based on 100 parts by weight of the polymer of epihalohydrin, said epihalohydrin polymer being selected from the group consisting of polymers of epihalohydrin, copolymers of epihalohydrin with alkylene oxides, and mixtures containing the polymers or the copolymers and sulphur-vulcanizable rubbers selected from at least one of the group consisting of natural rubber, styrene-butadiene rubber, butadiene rubber, isoprene rubber, isoprene-isobutylene rubber, acrylonitrile-butadiene rubber, ethylene-propylene-diene rubber and propylene oxide-allyl glycidyl ether copolymerized rubber, and present in not more than 50% by weight based on the weight of the mixture of the sulphur-vulcanizable rubbers with the polymers or copolymers.

2. A cross-linked polymer according to claim 1 in which in addition to said metal salts of ethylene-bisdithiocarbamic acid, said epihalohydrin polymer is incorporated with at least one accelerator selected from the group consisting of oxides and hydroxides of Group IIA metals of the Periodic Table, sulphur, thiuram sulfide, morpholine disulfide, secondary amines, tertiary amines, guanidines and mono- or di-carboxylates of these amines, with the proviso that: in the case of said metal oxides, said metal hydroxides and said amines or salts thereof they are contained in the amount of 0.1 – 20 parts by weight based on 100 parts by weight of the epihalohydrin polymer; and in the case of said sulphur and said sulfides, they are contained in the amount of 0.05 – 5 parts by weight based on 100 parts by weight of the epihalohydrin polymer.

3. A cross-linked polymer according to claim 1 in which said epihalohydrin is epichlorohydrin and said alkylene oxide is a member selected from the group consisting of ethylene oxides and propylene oxides.

4. A cross-linked polymer of an epihalohydrin prepared by heating at 120° to 200°C. a polymer of epihalohydrin in the presence of a metal salt of ethylene-bisdithiocarbamic acid having the following formula:

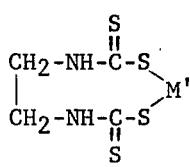

wherein symbol M' stands for a divalent metal ion selected from the group consisting of Pb and Zn
in the amount of from 0.1 to 10 parts by weight based on 100 parts by weight of the polymer of epihalohydrin; 0.1 – 20 parts by weight based on 100 parts by weight of the polymer of epihalohydrin of magnesia; at least one member selected from the group consisting of 0.05 – 5 parts by weight based on 100 parts by weight of the polymer of epihalohydrin of sulphur, thiuram disulfide, thiuram tetrasulfide and morpholine disulfide and 0 – 7 parts by weight based on 100 parts by weight of the polymer of epihalohydrin of $C_4 - C_9$ carboxylates of aliphatic or alicyclic secondary or tertiary amines, said epihalohydrin polymer being selected from the group consisting of poly(epichlorohydrin), copolymers of epichlorohydrin and ethylene oxide, copolymers of epichlorohydrin and propylene oxide and mixtures containing the polymers or copolymers and sulphur-vulcanizable rubbers selected from at least one of the group consisting of natural rubber, styrene-butadiene rubber, butadiene rubber, isoprene rubber, isoprene-isobutylene rubber, acrylonitrile-butadiene rubber, ethylene-propylene-diene rubber and propylene oxide-allyl glycidyl ether copolymerized rubber, and present in not more than 50 percent by weight based on the weight of the mixture of the sulphur-vulcanizable rubbers with said polymers or copolymers.

5. A process for production of a cross-linked polymer of an epihalohydrin, characterized by heating at 120° to 200°C. a polymer of an epihalohydrin in the presence of a metal salt of ethylene-bisdithiocarbamic acid having the following formula:

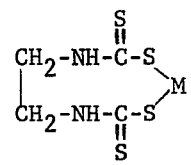

wherein M is a barium, zinc, copper, cadmium, lead, iron, nickel, or manganese ion
in the amount of from 0.1 to 10 parts by weight based on 100 parts by weight of the polymer of epihalohydrin and 1 – 7 parts by weight based on 100 parts by weight of the polymer of epihalohydrin of $C_4 - C_9$ carboxylates of aliphatic or alicyclic secondary or tertiary amines, said epihalohydrin polymer being selected from the group consisting of polymers of epihalohydrin, copolymers of epihalohydrin with alkylene oxide and mixtures containing the polymers or copolymers and sulphur-vulcanizable rubbers selected from at least one of the group consisting of natural rubber, styrene-butadiene rubber, butadiene rubber, isoprene rubber, isoprene-isobutylene rubber, acrylonitrile-butadiene rubber, ethylene-propylene-diene rubber and propylene oxide-allyl glycidyl ether copolymerized rubber, and present in not more than 50 percent by weight based on the weight of the mixture of other sulphurvulcanizable rubbers of these polymers or copolymers.

* * * * *